March 11, 1924.
P. G. DARLING
SAFETY VALVE RETARDING MECHANISM
Filed Jan. 14, 1922    3 Sheets-Sheet 1
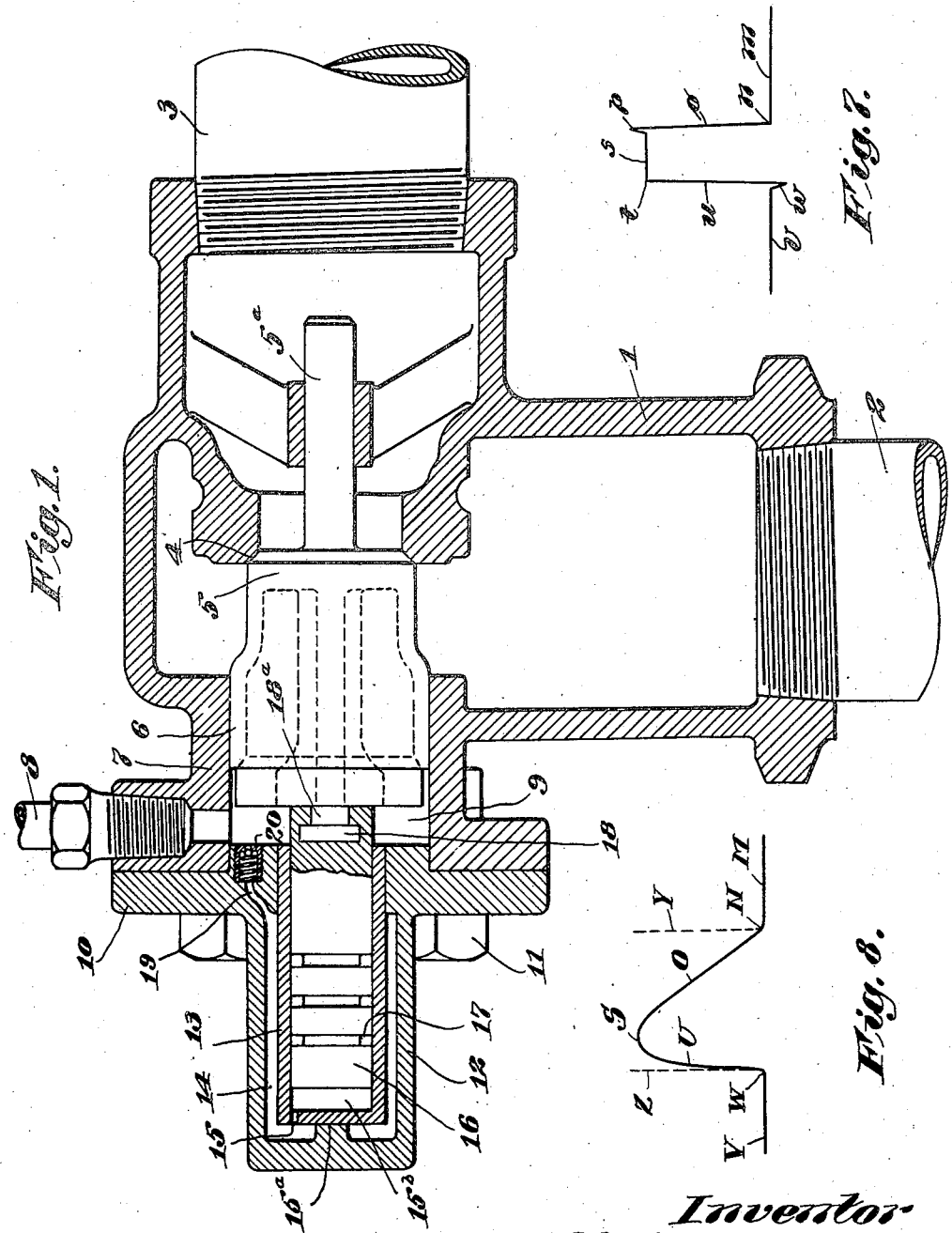
Inventor
Philip G. Darling
by Roberts, Roberts & Cushman
his Attorneys

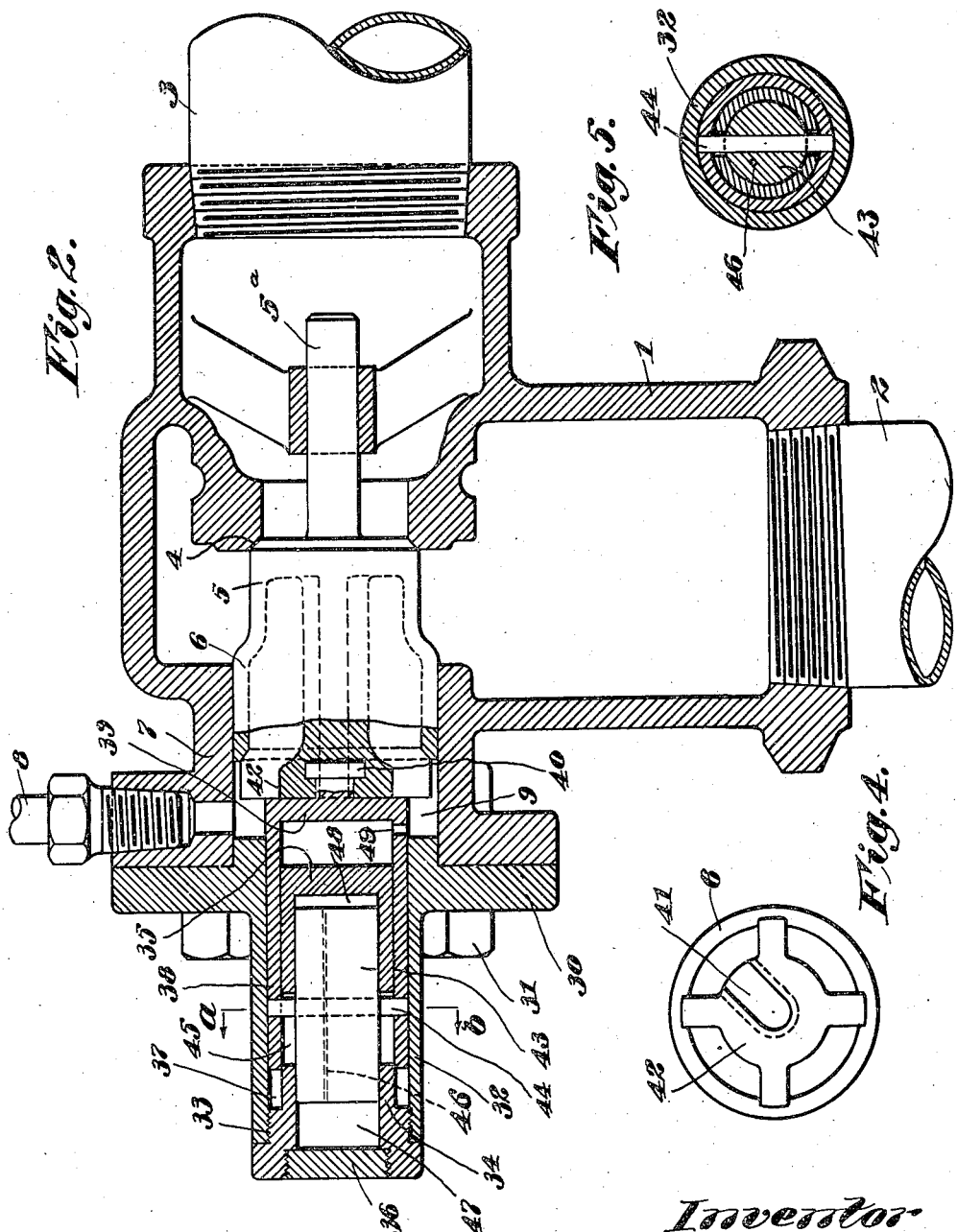

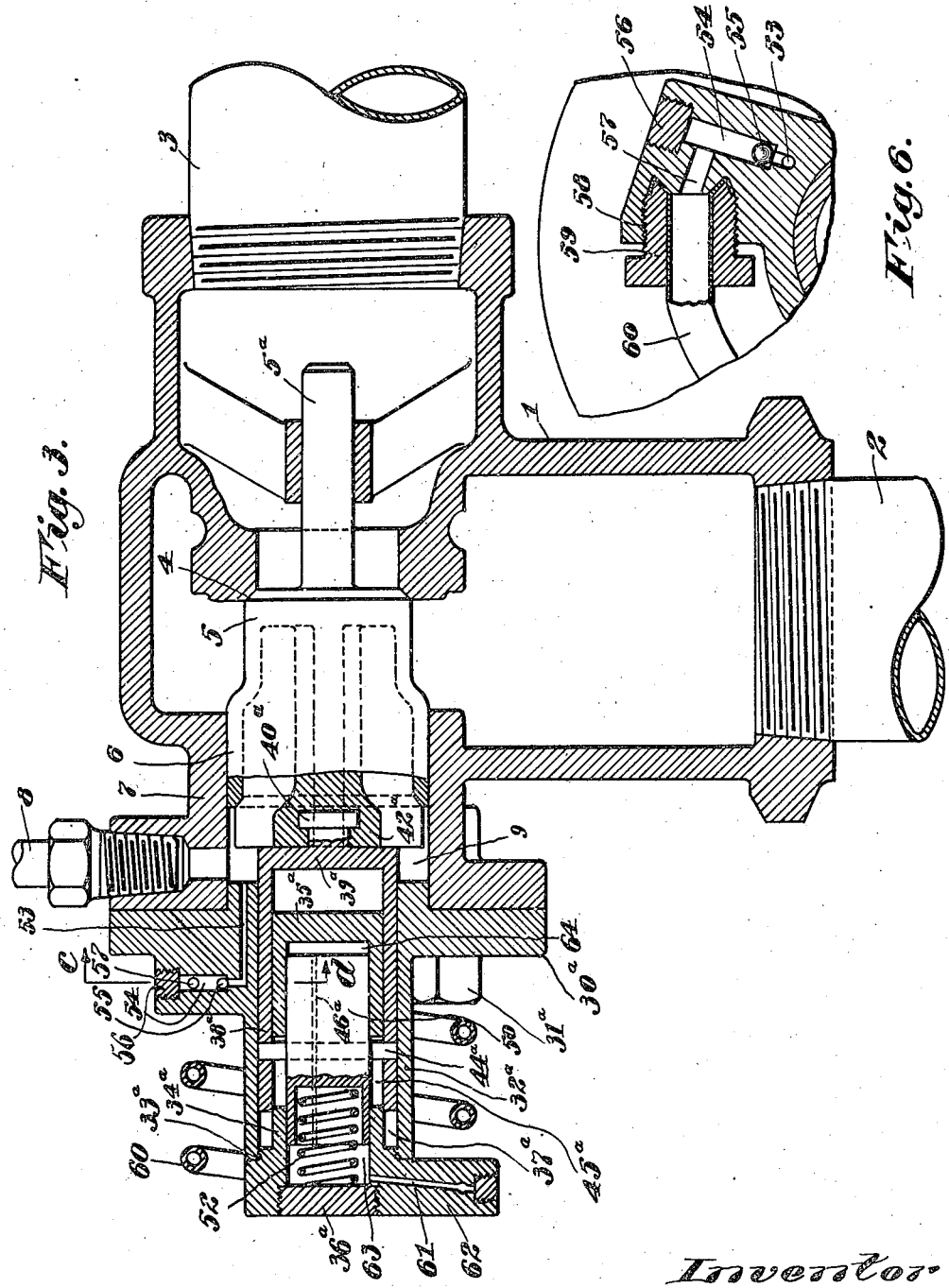

Patented Mar. 11, 1924.

1,486,126

UNITED STATES PATENT OFFICE.

PHILIP G. DARLING, OF BRIDGEPORT, CONNECTICUT, ASSIGNOR TO MANNING, MAXWELL & MOORE INC., OF NEW YORK, N. Y., A CORPORATION OF NEW JERSEY.

SAFETY-VALVE RETARDING MECHANISM.

Application filed January 14, 1922. Serial No. 529,194.

*To all whom it may concern:*

Be it known that I, PHILIP G. DARLING, a citizen of the United States of America, and resident of Bridgeport, in the county of Fairfield and State of Connecticut, have invented new and useful Improvements in Safety-Valve Retarding Mechanism, of which the following is a specification.

This invention concerns steam safety valves, and relates more particularly to valves of the so-called "full bore" type controlled in their actuation by suitable pilot valves.

The object of the present invention is to provide a retarding or cushioning device for safety valves, and particularly valves of the full bore type, of such a character as to retard the opening, and preferably also the closing of the valve, such device being reliable in character, automatic in operation, capable of withstanding the great variation in temperature to which such a device is exposed, requiring little or no care in its maintenance, and being compact in form and relatively low in cost.

To this end the moving element of the safety valve may have associated therewith a retarding piston movable in a suitable cylinder, such cylinder being continuously supplied with liquid from a convenient source. Preferably the liquid employed is water, and such water may be supplied automatically and in sufficient quantity by the condensation of boiler steam. Under most circumstances, it is found that the surfaces of the valve fittings and the cylinder radiate heat with sufficient rapidity to condense such steam as required, and which may be admitted to the cylinder through a suitable passage, or by leakage past the piston, but in some cases it may be found desirable to provide a cooling coil for condensing the steam and furnishing any desired amount of radiating surface. When such a passage or coil is employed, it is also desirable to provide it with a check valve of simple form to prevent forcing of the water of condensation back into the boiler upon actuation of the piston, and also to avoid reevaporation and wastage of such water under the lower pressure which may prevail in the cylinder when the piston is moved forwardly on closing of the safety valve. When the retarding device is employed only for slowing down the opening of the valve, a simple, and single acting piston may be employed, but for retarding the valve both in opening and closing, a double acting piston is used, the water within the cylinder passing alternately to the front and back of such piston and thus opposing its movement in either direction. As the full bore type of valve is usually pressure actuated, it is desirable to provide some auxiliary means, such for example as a spring, for insuring the closure of the valve when starting up the boiler, and advantage may be taken of the shape and position of certain parts of the retarding mechanism for conveniently housing a spring for urging the valve member toward its seat.

In the accompanying drawings there is illustrated by way of example one embodiment of means suitable for carrying the invention into effect, and in said drawings, Fig. 1 is a vertical cross section through a safety valve of the full bore type such section being in a plane diametral of the valve seat, the device of the present invention being illustrated as applied to such valve;

Fig. 2 is a view similar to Fig. 1, but illustrating a modified construction of the device of the present invention;

Fig. 3 is a similar view but showing a further modification;

Fig. 4 is an end elevation showing the left-hand end of the valve actuating piston as viewed in Fig. 2;

Fig. 5 is a tranverse cross section on the line *a—b* of Fig. 2;

Fig. 6 is a tranverse cross section on the line *c—d* of Fig. 3; and

Figs. 7 and 8 are diagrammatic views illustrating the mode of operation of a valve of usual type, and of a valve embodying the present invention respectively.

Referring to Fig. 1, a safety valve casing is indicated by the numeral 1, such casing being secured at its lower end to a pipe 2 whereby it is connected to the boiler, and being also connected to a discharge pipe 3. The valve casing provides an annular valve seat 4 with which cooperates a slidable valve 5 having a guiding stem $5^a$, and also having an integral actuating piston 6, slidable in a cylindrical portion 7 of the valve casing. A pipe 8 leads from the space 9, at the rear of the piston 6, to a pilot valve device (not shown) which controls the exhaust of steam from the space 9. The safety valve thus far described is of the general type disclosed in the application of Philip G. Darling, Serial No. 482,047, filed July 2, 1921, to which application reference may be had for a more complete description of the same and of its mode of operation.

In accordance with the present invention the cover plate, which is employed, as disclosed in the above noted application, for closing the rear end of the valve casing, is replaced by a cover member 10 secured in position by means of bolts 11 and having an integral cylindrical housing 12 extending therefrom, such housing being hollow and aligning with the axis of the piston 6. Within the housing 12 is arranged a cylinder 13, such cylinder being spaced from the side walls of the housing 12 as indicated at 14 and being provided at its outer end with an opening 15 communicating with the space 14. The end of the cylinder 13 engages a lug 15$^a$ whereby such end is also spaced from the end wall of the housing 12. Any suitable means may be provided for retaining the cylinder 13 in fixed position within the housing.

A piston 16 is slidably fitted within the cylinder 13, such piston being provided, if desired, with water packing grooves 17 or with other suitable packing device. The inner end of the piston 16 is provided with a slot within which fits a head 18 formed upon a stem member 18$^a$ projecting from the end of the valve actuating piston 6. The space 14, surrounding the cylinder 13, communicates with the space 9 to the rear of the valve actuating piston by means of a passage 19, such passage preferably being controlled by a check valve device of any desired form, indicated at 20.

In the operation of the device just described, it being assumed that the valve 5 rests upon the seat 4, thus closing the passage between the pipe 2 and the pipe 3, steam leaks into the space 9 around the piston 6 and builds up pressure in such space sufficient to maintain the valve 5 upon its seat. Steam from the space 9 also bleeds through the passage 19 into the space 14, and by reason of the large radiating surface provided by the housing 12, such steam is condensed in the space 14 and the water of condensation gradually passes through the opening 15 into the space 15$^b$ at the outer end of the piston 16. When the pilot valve blows, the steam in the space 9 is exhausted, permitting pressure upon the inner end of the piston 6 to move the latter to the left as viewed in Fig. 1, thereby opening the valve 5. The movement of the valve 5 and piston 6 to the left is however, opposed by the water contained in space 15$^b$ and acting against the head of the piston 16. As the water in the spaces 15$^b$ and 14 is unable to move backwardly through the passage 19 by reason of the check valve device 20, it is evident that the piston 16 will be very much retarded in its movement and is only able to move at the rate permitted by the leakage of water past the piston 16. The opening movement of the valve 5 is thus slowed down to a very appreciable extent so that any injurious shock to the boiler, as well as any tendency to lift the water therein, is avoided, while at the same time the opening of the valve is accomplished without producing the startling noise commonly occurring when safety valves open.

In the device shown in Fig. 1 the piston 16 is positive in its action only upon opening of the valve and in the use of this device but a slight retarding of the valve is observed in the closing of the same. In the modified arrangement illustrated in Fig. 2 however, the valve is substantially retarded both in opening and in closing. In this figure the valve casing 1, the boiler connection 2, the outlet 3, the valve seat 4, the valve 5 with its guiding stem 5$^a$, the actuating piston 6 and the cylinder 7 within which such piston acts, are all like those previously described in respect to Fig. 1. The pipe 8 leading to the pilot valve and communicating with the space 9 also functions in the manner previously described. In this case, however, the rear end of the valve casing is closed by the flange member 30 secured in position by bolts 31, such flange member having the cylindrical housing 32 projecting therefrom and in alignment with the axis of the valve 5. The housing 32 is open at its outer end and is internally screw threaded at 33 for engagement with a cylinder 34, such cylinder being closed at its inner end as shown at 35 and being provided with a cover member 36 for closing its outer end. The cylinder 34 is spaced from the housing 32 as indicated at 37 and within the space 37 is slidably arranged an actuating device 38. This actuating device is herein illustrated as a cylinder, having its inner end 39 closed, such inner end being provided with an axial stem having an enlarged head 40. The head 40 is engageable within an undercut slot 41 formed in a stem 42 projecting rearwardly from the valve actuating piston 6, the head 40 serving to secure the member 38 to the piston for movement therewith. Within the cylinder 34, a piston 43 is slidably fitted, such piston being provided with a transverse pin 44 which projects from opposite sides of the piston. The projecting ends of the pin 44 extend through diametrally disposed, elongated slots 45 in the wall of the cylinder 34 and are seated in openings in the actuating member 38 whereby movement of the latter is transmitted to the piston 43. If desired, the piston 43 may be provided with a passage 46 of small diameter, extending from end to end of the same, although it is contemplated that substantially the same results may be obtained by providing a loose fit between the piston and its cylinder. Preferably an opening or passage 49 is provided leading from the space 9 into the interior of the actuating member 38.

In the operation of the device, the valve 5 resting against the seat 4 and steam pressure being maintained in the space 9, steam from such space will leak through the passage 49 into the interior of the actuating cylinder 38 and may also leak past the exterior surface of such cylinder, the steam thus passing into the interior of the cylinder 34 where it condenses in the spaces 47 and 48 at the opposite ends of the piston 43. When now the pressure in space 9 is relieved and the piston 6 starts to move to the left as viewed in Fig. 2 such movement is opposed by the water of condensation in space 47, acting against the end wall of the piston 43. Movement of such piston can thus take place only in accordance with the leakage of water from the space 47 through the passage 46 into the space 48 and thus the opening of the valve 5 is very appreciably retarded. When now the pilot valve is closed and pressure again builds up in space 9, piston 6 tends to move to the right for closing the valve 5. Such closing however, is opposed by the presence of water in the space 48 and movement of the valve 5 in closing is thus dependent upon the rate with which water from space 48 may leak past or through the piston 43 in returning to the space 47. With this arrangement it is clear both opening and closing of the valve 5 are retarded to a substantial degree.

While ordinarily the arrangement described in Fig. 2 provides the requisite quantity of condensed steam at all times within the cylinder 34, it may under some circumstances be desirable to provide means in addition to the radiating surfaces of the housing 32 for insuring an adequate supply of water of condensation within the retarding cylinder. Such an arrangement is illustrated in Fig. 3 wherein the valve casing 1, the boiler connection 2, the exhaust pipe 3, the valve seat 4, the valve 5 with its guiding stem 5$^a$ and actuating piston 6 are all as heretofore described in respect to Fig. 1. The piston 6 also works in a cylindrical portion 7 of the valve casing and the pipe 8, leading to a pilot valve, controls the pressure in the space 9. In accordance with the present arrangement however, the space to the rear of the piston 6 is closed by a flanged cover 30$^a$ secured in position by bolts 31$^a$ and from such flanged cover projects a cylindrical housing 32$^a$ arranged in alignment with the axis of the valve 5. The outer end of the housing 32$^a$ is open and is internally screw threaded as at 33$^a$ for the reception of a cylinder 34$^a$ having a closed inner end 35$^a$ and provided with a removable cover 36$^a$ for closing its outer end. The cylinder 34$^a$ is spaced from the housing 32$^a$ as indicated at 37$^a$ and within the space between such parts is disposed the slidable actuating member 38$^a$, such member having the head 39$^a$ at its inner end. This head is provided with a connecting element 40$^a$ engageable with a slot in the stem 42$^a$ projecting from the piston 6 whereby the actuating member 38$^a$ is firmly secured to the piston 6 for movement therewith. The cylinder 34$^a$ is provided with diametrally disposed elongated slots 45$^a$ through which pass the projecting ends of a pin 44$^a$ carried by a piston 50. The ends of the pin 44$^a$ are secured in openings in the actuating member 38$^a$ whereby movement of the latter is transmitted to the piston 50. This piston is preferably provided at its outer end with an axial cavity 51 in which is seated the end of a coiled spring 52 whose outer end bears against the cover member 36$^a$. The flange member 30$^a$ is provided with a passage 53 leading from the space 9 to a chamber 54 within which is arranged a ball check valve 55. The outer end of the chamber 54 may be closed by a cover member 56, and leading laterally from the chamber 54 is a passage 57 (Fig. 6) which opens into a chamber of larger diameter and internally screw threaded as indicated at 58. A nipple 59 engages the screw threads 58, such nipple serving for the connection of a pipe coil 60, such coil encircling the housing 32$^a$ and having its opposite extremity communicating with a passage 61 formed in a boss 62 projecting from the outer end of the cylinder 34$^a$. The passage 61 leads into the space 63 to the left of the piston 50, as viewed in Fig. 3, and such piston may, if desired, be provided with a restricted passage 46$^a$ extending longitudinally thereof and opening into the space 64 at the inner end of the cylinder 34$^a$.

With the above arrangement, the coil spring 52 which may be normally under slight tension, tends to move the piston 50 together with the member 38$^a$, the piston 6 and the valve 5 to the right as viewed in Fig. 3, thus urging the valve 5 toward its seat. With the parts in the position shown in Fig. 3, steam from the space 9 bleeds through the passage 53 into the chamber 54 and thence into the pipe coil 60. Such coil furnishes a radiating surface of large extent in addition to the radiating surface provided by the housing 32$^a$, whereby the steam is condensed, the water of condensation passing through the opening 61 into the space 63 at the outer end of the piston 50. When upon release of pressure in the chamber 9 the piston 6 starts to open the valve 5, the water in the space 63 retards the movement of piston 50 in the same manner as described in connection with the device of Fig. 2, such water passing slowly to the inner end of the cylinder 34ª where it is in a position to retard the closing of the valve 5 at the completion of the blow-off period.

As in starting up a boiler there is no appreciable pressure in the space 9, such as is necessary to close the valve 5, it has been found desirable to provide the spring 52 which normally tends to hold the valve 5 against its seat with sufficient pressure to prevent the free escape of steam from the boiler into the discharge pipe 3, and in order to secure a compact arrangement of parts advantage has been taken of the presence of the piston 50 with its connections to the valve 5 in providing a suitable location for such actuating spring.

In Fig. 7 there is shown a lift card illustrating the movements of the valve member of a full bore safety valve in opening and closing, such valve being unprovided with the present improvements. In this figure the line $m$ indicates the closed position of the valve. At the point $n$ the valve begins to open, and as indicated by the substantially vertical line $o$, the valve opens almost instantaneously to the discharge level $s$. The cusp at $p$ is produced, partly by the momentum of the indicating mechanism and partly by overlift of the valve due to the kinetic energy of the steam escaping, as well as to the momentum of the valve parts themselves. The valve remains open at a substantially constant lift as indicated by the line $s$ until at the point $t$ the valve closes and as indicated by the vertical drop $u$ the valve closes almost instantaneously, the line $v$ indicating the position of full closure of the valve. The cusp $w$ is also produced as the valve comes to rest upon its seat due to the same causes which produce the cusp at $p$.

In Fig. 8 is illustrated a lift card produced by the use of the mechanism shown in Figs. 2 and 3. In this diagram the line M indicates the position of closure of the valve, the point N showing the point of opening of the valve. In this case however, the opening of the valve is not instantaneous, but is quite gradual as indicated by the inclined line O, the maximum opening being at the point S. When the valve closes the movement is also gradual as indicated by the sloping line U, the valve regaining its seat at the point W and the line V again indicating the point of zero lift. By comparison of the vertical line Y and the line of lift O, it is easily observed that the opening of the valve is retarded very materially as compared with an instantaneous opening such as is produced by most valves of ordinary type. Comparison of the lines Z and U also serves to show that the closing movement of the valve is somewhat retarded. The diagram of Figs. 7 and 8 are facsimiles of actual lift cards in which the ordinates indicate twice the valve lift, while abscissæ represent a movement of the recording drum of twenty-four linear inches per minute.

By the use of the various arrangements hereinbefore described it is clear that a supply of water for the retarding piston is assured at all times and under all conditions of operation and that such water is supplied automatically and in exact accordance with the requirements of the mechanism. It is thus unnecessary for the engineer to inspect the device frequently for the purpose of adding additional fluid, as is the case where devices employing oil or glycerine as the retarding medium have been attempted, while at the same time applicant's device is compact in form and requires no additional piping to the boiler or other exterior source of fluid supply. The device has proved in practice to be substantial and durable as well as extremely reliable in operation and to accomplish the desired results in a highly effective manner. While the arrangement has been illustrated as applied to a safety valve of a specific type, it is to be understood that a similar arrangement of parts might well be applied to valves of other types and construction and it is contemplated as within the spirit of the present invention that such retarding device will be applied to valves of various forms and that changes and modifications in the specific arrangement of the various parts as well as in materials employed or relative dimensions of the various elements, may be made from time to time in accordance with the requirements of each particular application of the device.

Having thus described the invention in a preferred embodiment of the same together with the mode of operation thereof, what I claim and desire to secure by Letters Patent of the United States is:

1. In combination with a safety valve for steam boilers, a controlling device for such valve comprising a movable element, and means whereby water of condensation from boiler steam is automatically admitted to one side of said element whereby to retard the movement thereof.

2. In combination with a steam safety valve for steam boilers comprising a movable valve member, means for retarding movement of said member comprising a piston movable in a cylinder, and means whereby said cylinder may be continuously supplied with water of condensation from boiler steam.

3. An apparatus for controlling the operation of a safety valve mounted upon a steam boiler comprising a piston provided with means for detachably connecting it to the movable member of said valve, means whereby steam is admitted to a space adjacent to said piston, and means whereby such steam is condensed within said space.

4. A retarding device for safety valves for steam boilers comprising a cylinder, a piston therein, mean providing a heat radiating surface for the condensation of boiler steam, and means whereby the water of condensation is permitted to collect in said cylinder to one side of the piston.

5. A controlling device for safety valves comprising a cylinder, a piston therein, means for removably connecting such piston to the movable element of a safety valve, steam condensing means, and means whereby water of condensation from said condensing means may be admitted to said cylinder.

6. A retarding device for steam safety valves comprising a cylinder having closed ends, a piston slidable in said cylinder, means whereby the piston may be connected to the movable element of a safety valve, and means permitting water of condensation to collect in said cylinder.

7. A retarding device for steam safety valves comprising a cylinder having closed ends, a piston in said cylinder, said piston having a restricted passage therethrough, means for connecting said piston to the movable element of a safety valve, and means whereby liquid may be continuously supplied to said cylinder in sufficient quantity to fill the space therein at one side of the piston.

8. A retarding device for safety valves comprising a cylinder, a piston therein, a passage opening at one end into said cylinder and connected at its opposite end with a steam supply, and a check valve in said passage for preventing the return of steam or water of condensation from the cylinder to said source of supply.

9. A controlling device for safety valves comprising a cylinder, a piston therein, said piston being constructed and arranged for connection to the movable element of a safety valve, a steam condensing coil, and means whereby water of condensation from said coil may be admitted to said cylinder at one end thereof.

10. A controlling device of the class described comprising a cylinder, a piston therein, a steam condensing coil surrounding said cylinder, and means whereby water of condensation from said coil may be admitted to the cylinder.

11. In a combination with a safety valve device having a movable valve member, a retarding mechanism comprising a housing, a cylinder within said housing, a piston slidable within the cylinder, means for connecting said piston and the movable valve member, a pipe coil surrounding the housing and opening at one end into said cylinder and communicating at its other end with a source of steam supply, and a check valve for controlling the movement of fluid in said pipe coil.

12. In combination with a safety valve having a movable valve member, means for retarding said valve member in its movement comprising a cylindrical housing, a cylinder within said housing and spaced from the walls thereof, a piston slidable within the cylinder, an actuating device slidable within the space between the cylinder and housing, means for connecting the actuating device to the movable valve member, and means to connect said actuating device with the piston.

13. In combination with a safety valve device having a pressure actuated valve member, a controlling mechanism for said member comprising a housing having a cylinder therein and spaced from the inner walls thereof, a piston in said cylinder, said piston having a cavity in its outer end, a spring seated within said cavity and bearing against the adjacent end of the cylinder, and means for connecting said piston to the valve member.

Signed by me at Bridgeport, Connecticut, this 4th day of Jan., 1922.

PHILIP G. DARLING.